US008534981B1

(12) United States Patent
Bortz (10) Patent No.: US 8,534,981 B1
(45) Date of Patent: Sep. 17, 2013

(54) TRUCK BED BALE LOADER AUXILIARY ASSEMBLY

(76) Inventor: Berry K. Bortz, Preston, KS (US)

( * ) Notice: Subject to any disclaimer, the term of this patent is extended or adjusted under 35 U.S.C. 154(b) by 278 days.

(21) Appl. No.: 12/861,881

(22) Filed: Aug. 24, 2010

(51) Int. Cl.
*B60P 1/44* (2006.01)
(52) U.S. Cl.
USPC .............................. 414/546; 414/462; 414/712
(58) Field of Classification Search
USPC .......................................... 414/546, 607, 712
See application file for complete search history.

(56) References Cited

U.S. PATENT DOCUMENTS

| | | | |
|---|---|---|---|
| 2,488,767 A | 11/1949 | Drott et al. | |
| 2,580,480 A | 1/1952 | Strehlow et al. | |
| 2,687,238 A | 8/1954 | Tanke | |
| 3,006,486 A | 10/1961 | Cook | |
| 3,022,754 A | 2/1962 | Sorensen et al. | |
| 3,126,110 A * | 3/1964 | Dinklow | 414/546 |
| 3,195,248 A * | 7/1965 | Martin | 37/442 |
| 3,820,673 A * | 6/1974 | McVaugh | 414/546 |
| 3,942,651 A | 3/1976 | Neely, Jr. | |
| 3,952,896 A | 4/1976 | Hayward | |
| 4,120,405 A | 10/1978 | Jones et al. | |
| 4,128,179 A * | 12/1978 | Gilbert | 414/24.5 |
| 4,214,840 A * | 7/1980 | Beales | 403/31 |
| 4,329,103 A * | 5/1982 | Miller | 414/24.5 |
| 4,364,700 A | 12/1982 | Arabshian et al. | |
| 4,422,818 A * | 12/1983 | Molby | 414/712 |
| 4,564,325 A | 1/1986 | Ackerman | |
| 4,583,907 A | 4/1986 | Wimberley | |
| 4,594,041 A | 6/1986 | Hostetler | |
| 4,710,086 A | 12/1987 | Naaktgeboren et al. | |
| 4,710,087 A | 12/1987 | Naaktgeboren et al. | |
| 4,778,327 A | 10/1988 | Tufenkian et al. | |
| 4,895,086 A | 1/1990 | Tye, III | |
| 5,129,775 A | 7/1992 | Coats et al. | |
| 5,135,343 A | 8/1992 | Wigness | |
| 5,163,518 A | 11/1992 | Foley | |
| 5,178,505 A | 1/1993 | Smith | |
| 5,431,528 A * | 7/1995 | Jenkins et al. | 414/723 |
| 5,544,709 A | 8/1996 | Lowe et al. | |
| 5,584,637 A | 12/1996 | Jenson, Sr. | |
| 5,639,198 A | 6/1997 | Pearce | |
| 5,709,523 A * | 1/1998 | Ware | 414/715 |
| 5,882,085 A | 3/1999 | Pekarek | |
| 5,915,837 A * | 6/1999 | Brown et al. | 37/468 |
| 5,918,451 A | 7/1999 | Vonesch | |
| 5,975,824 A | 11/1999 | Hostetler | |
| 6,099,227 A | 8/2000 | Shellhammer | |
| 6,099,228 A | 8/2000 | Krogman | |
| 6,234,741 B1 | 5/2001 | McDaniel | |

(Continued)

FOREIGN PATENT DOCUMENTS

DE 8804301 5/1988
DE 3933834 4/1991

*Primary Examiner* — James Keenan
(74) *Attorney, Agent, or Firm* — Kenneth H. Jack; Davis & Jack, L.L.C.

(57) ABSTRACT

An auxiliary assembly for attachment to a truck bed, the truck bed having pivoting bale lift arms, and the truck bed further having a hydraulic ram powered bale arm actuator, the assembly including a cargo carrying frame, left and right releasably attachable and pivoting mounts for interconnecting the cargo carrier and distal ends of the bale lift arms, and a pair of cargo leveling arms pivotally mounted to span between and interconnect the truck bed and with the cargo carrier for simultaneous and substantially parallel leveling arm motion, the leveling arm motion stabilizing the cargo carrier during pivoting motions of the bale lift arms.

4 Claims, 6 Drawing Sheets

(56) References Cited

U.S. PATENT DOCUMENTS

| | | | |
|---|---|---|---|
| 6,364,597 B2 * | 4/2002 | Klinkenberg | 414/462 |
| 6,386,820 B1 * | 5/2002 | Cunningham | 414/550 |
| 6,435,806 B1 | 8/2002 | Rinderknecht | |
| 6,817,825 B1 | 11/2004 | O'Hagen | |
| 6,884,018 B1 | 4/2005 | Dugan et al. | |
| 7,055,878 B2 * | 6/2006 | Imhof | 296/26.07 |
| 7,520,213 B2 | 4/2009 | Wilson et al. | |
| 7,544,034 B2 | 6/2009 | Baer | |
| 7,568,878 B2 | 8/2009 | Frey | |
| 8,157,316 B1 * | 4/2012 | Bartel | 296/183.2 |
| 2001/0014272 A1 | 8/2001 | Ochoa | |
| 2003/0079883 A1 * | 5/2003 | McCulloch et al. | 166/379 |
| 2006/0245891 A1 * | 11/2006 | Flaherty | 414/607 |

* cited by examiner

TRUCK BED BALE LOADER AUXILIARY ASSEMBLY

FIELD OF THE INVENTION

This invention relates to load beds of commercial and agricultural utility trucks which are specially equipped to include pivoting and hydraulically actuated hay bale lifting arms. More particularly, this invention relates to auxiliary equipment and assemblies which are attachable to such truck bed hay bale lifting adaptations and equipment.

BACKGROUND OF THE INVENTION

Commercial and agricultural flat bed trucks are commonly known to be equipped with articulating arms which are hydraulically actuated for hay bale grasping, engaging, lifting, and truck load bed depositing. In a common configuration of such equipment, a left and right pair of such bale engaging, grasping, and lifting arms are pivotally mounted at the rearward end of the truck's bed, such arms being operatively adapted to function with respect to heavy hay bales in the manner of tongs or forceps. Typically, two way hydraulic ram linear motion actuators are operatively associated with the pivotally attached bale lift arms for impelling reciprocating lateral movements of the arms' distal ends, for hay bale engagement and for, upon bale engagement, pivotally moving between a rearward bale engaging or off-loading position and an upwardly and forwardly extending position at which a hay bale may be deposited upon and secured at the truck's bed.

While such commercial or agricultural trucks are used much of the time for loading, carriage, and off-loading of hay bales during hay harvest, and for carriage of bales during livestock wintering, such trucks are often used at other times in a versatile fashion for carriage for numerous other types of agriculture related equipment and materials. For example, such trucks and truck beds may be utilized for carriage for heavy feed sacks, livestock feeders, head gates, squeeze chutes, and heavy motorized equipment such as pumps, generators, and welding equipment.

Where such agricultural commercial flatbed trucks are utilized for carriage of such other agricultural items, the truck's attached pivot arm bale loading equipment is typically of little use in loading of such other equipment and articles.

The instant invention serves to better match the use and versatility of the above described pivot arm bale loading equipment to the general versatility and capacity for multiple use of agricultural trucks and truck beds by providing specialized removable and attachable structures and components which may adapt such common hay bale loading equipment for use in loading, carriage, and off-loading of numerous other types of commercial or agricultural equipment and articles.

BRIEF SUMMARY OF THE INVENTION

The instant inventive auxiliary assembly is preferably adapted for alternative attachment to and detachment from a commercial or agricultural truck bed. Typically, such truck bed has left and right sides, a rearward end, and rearwardly mounted left and right bale lift arms, such arms having proximal and distal ends. The bale lift arms are typically adapted for moving between a rearwardly extending bale engaging and grasping position and a forwardly and upwardly extending position overlying the truck load bed for hay bale depositing and securing. Where a truck bed is so equipped, its attached and pivotally movable left and right bale lift arms typically have an operatively associated pivotal motion actuator. Such actuator typically comprises a plurality of two way hydraulic cylinders which are connected and adapted for impelling the left and right bale lift arms' movements between their rearwardly extending and forwardly extending positions. In a typical configuration, the pivotal motion actuator comprises a two way hydraulic, cylinder, pivot axle, and lever arm which is mounted for, upon retracting actuation of the cylinder, pivoting the bale lift arms upwardly and toward the truck bed for depositing and securing a hay bale thereupon, and upon extending actuation, for alternatively off-loading such hay bales. Also, in the typical configuration, second laterally aligned hydraulic cylinders are mounted at a base cross-member which spans between the bale lift arms' proximal ends, such cylinders actuating laterally reciprocating pincer or forceps motions of the bale lift arms' distal ends for alternatively engaging and releasing hay bales.

A first structural component of the instant inventive auxiliary assembly comprises a cargo carrier having a load supporting floor and having left and right sides. Typically, the cargo carrier may comprise a simple rigid box frame. Alternatively, the cargo carrier may comprise an enclosed or open box, a bin, a recreational all terrain vehicle carrier, a small recreational water craft carrier, a livestock feeder, a livestock head gate, a livestock squeeze chute, or a livestock incubator. Further alternatively, the cargo carrier may comprise a rigid frame whose floor is specially configured to function as a pair of forklift tines which are capable of engaging and lifting materials loaded upon cargo pallets.

Further structural components of the instant inventive auxiliary assembly comprise left and right lift arm attaching means which are preferably adapted for respectively pivotally interconnecting the cargo carrier's left and right sides and the left and right bale lift arms' distal ends. In a preferred embodiment, such left and right lift arm attaching means comprise swivel pin and socket joints wherein the sockets comprise pin receiving adaptations presented upon the cargo carrier, and wherein the swivel pins are attached to and cantilever inwardly from the bale lift arms' distal ends. In a preferred embodiment, sleeve adaptors are provided for ease and convenience in attaching and detaching the swivel pins at the bale lift arms' distal ends, and for adjustably positioning the swivel pins along the bale lift arms' lengths.

A further structural component of the instant inventive auxiliary assembly preferably comprises at least a first, and preferably a pair of or left and right cargo leveling arms. Leveling arm attaching means are also provided, such means being adapted for pivotally mounting and positioning the leveling arms' proximal ends at left and right sides of the truck bed, and forwardly from the truck bed's rearward ends. The leveling arm attaching means are preferably further adapted for pivotally mounting and positioning said arms' distal ends at left and right sides of the cargo carrier, and forwardly from the co-pivoting connections of the bale lift arms' distal ends.

In operation of the instant inventive auxiliary assembly, and assuming the provision of a pair of, or left and right, leveling arms the hydraulically actuated bale lift arms may be operated in a conventional fashion to pivotally extend rearwardly, just as though the arms were being extended for grasping a hay bale. However, according to the alternative and additionally versatile function provided by the instant invention, such rearwardly pivoting motion of the bale lift arms advantageously carries the pivotally attached cargo carrier to a convenient ground level position to the rear of the truck for loading of heavy commercial or farm related articles and equipment. Upon such loading of equipment, the bale lift arms may be re-actuated to raise and to pivot upwardly and forwardly, such pivoting motion carrying the cargo carrier and its loaded equipment upwardly and forwardly for deposit and carriage upon the truck bed. During such pivoting motions of the bale lift arms, the inventive assembly's leveling arms pivotally track with the bale lift arms in substantially parallel alignment the lift arms' pivotal radius. Such simultaneous pivoting advantageously maintains the cargo carrier in a constant and substantially horizontal orientation with respect to the ground. By resisting any swinging motion of the cargo carrier, the instant inventive assembly advantageously prevents upsetting, toppling, or spilling the contents of the cargo carrier during loading.

Accordingly, it is an object of the instant invention to provide an auxiliary assembly for alternative attachment to and detachment from a truck bed which provides and incorporates structures as described above, and which arranges those structures in relation to each other, and with respect to each other in the manners described above, for the performance of beneficial functions described above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
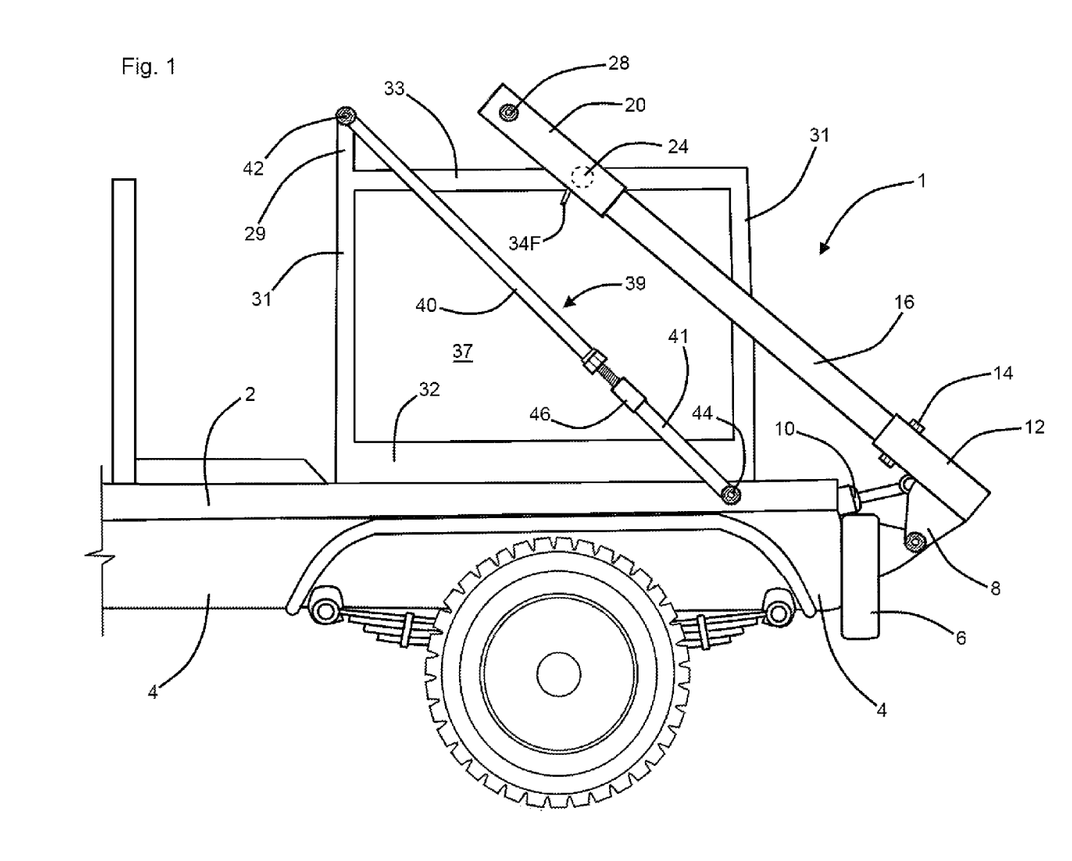
FIG. 1 is a side view of the instant inventive auxiliary assembly for alternative attachment to and detachment from a truck bed.

Referring now to the drawings, and in particular to Drawing FIG. 1, a preferred embodiment of the instant inventive auxiliary assembly for alternative attachment to and detachment from a truck bed is referred to generally by Reference Arrow 1. The truck bed 2 is supported by a truck chassis 4 which rearwardly supports a heavy duty truck bumper 6.

Figure 2:
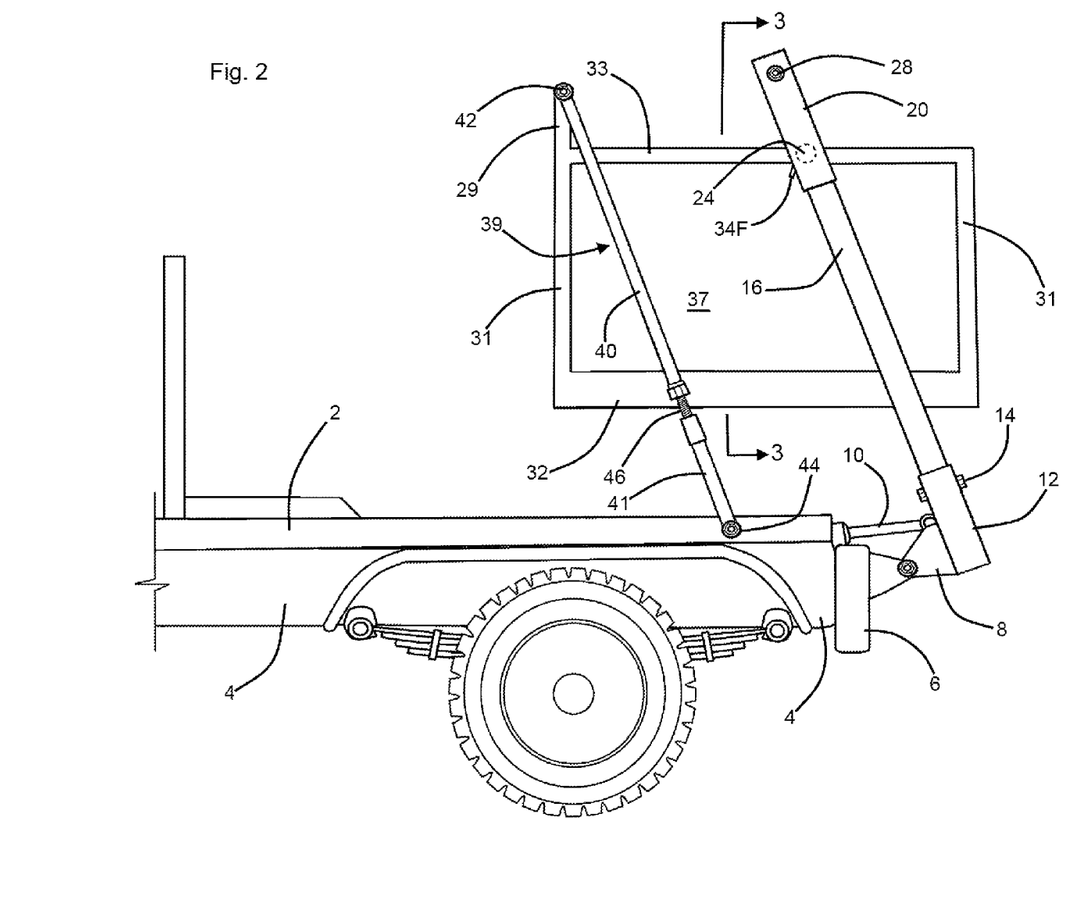
FIG. 2 redepicts the structure of FIG. 1, the view of FIG. 2 showing the inventive assembly in intermediate position.
Figure 3:
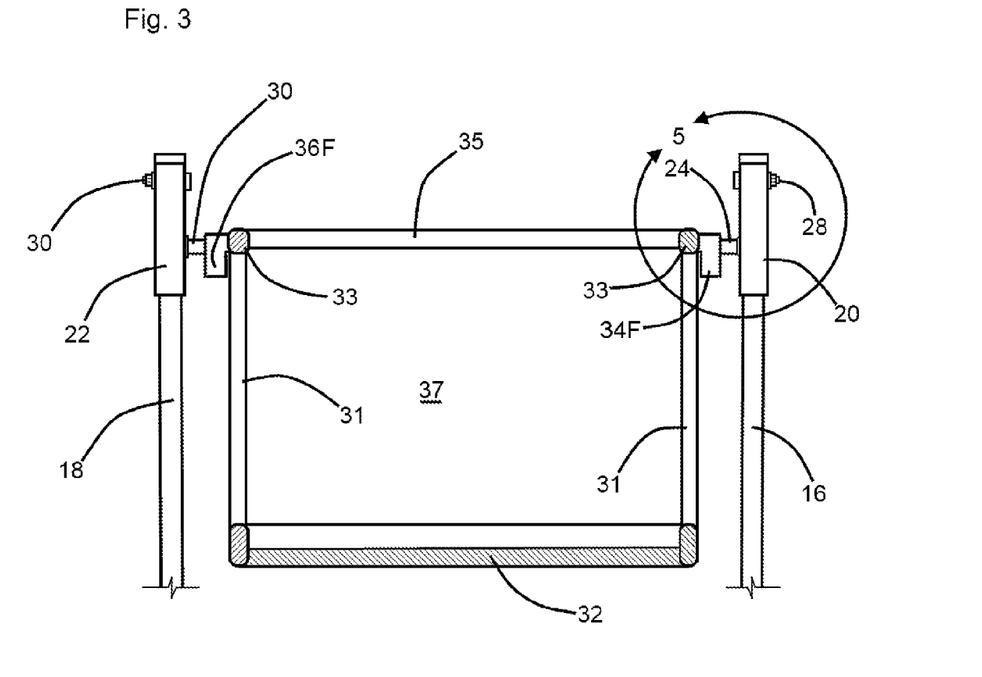
FIG. 3 is a partial sectional view as indicated in FIG. 2.
Figure 4:
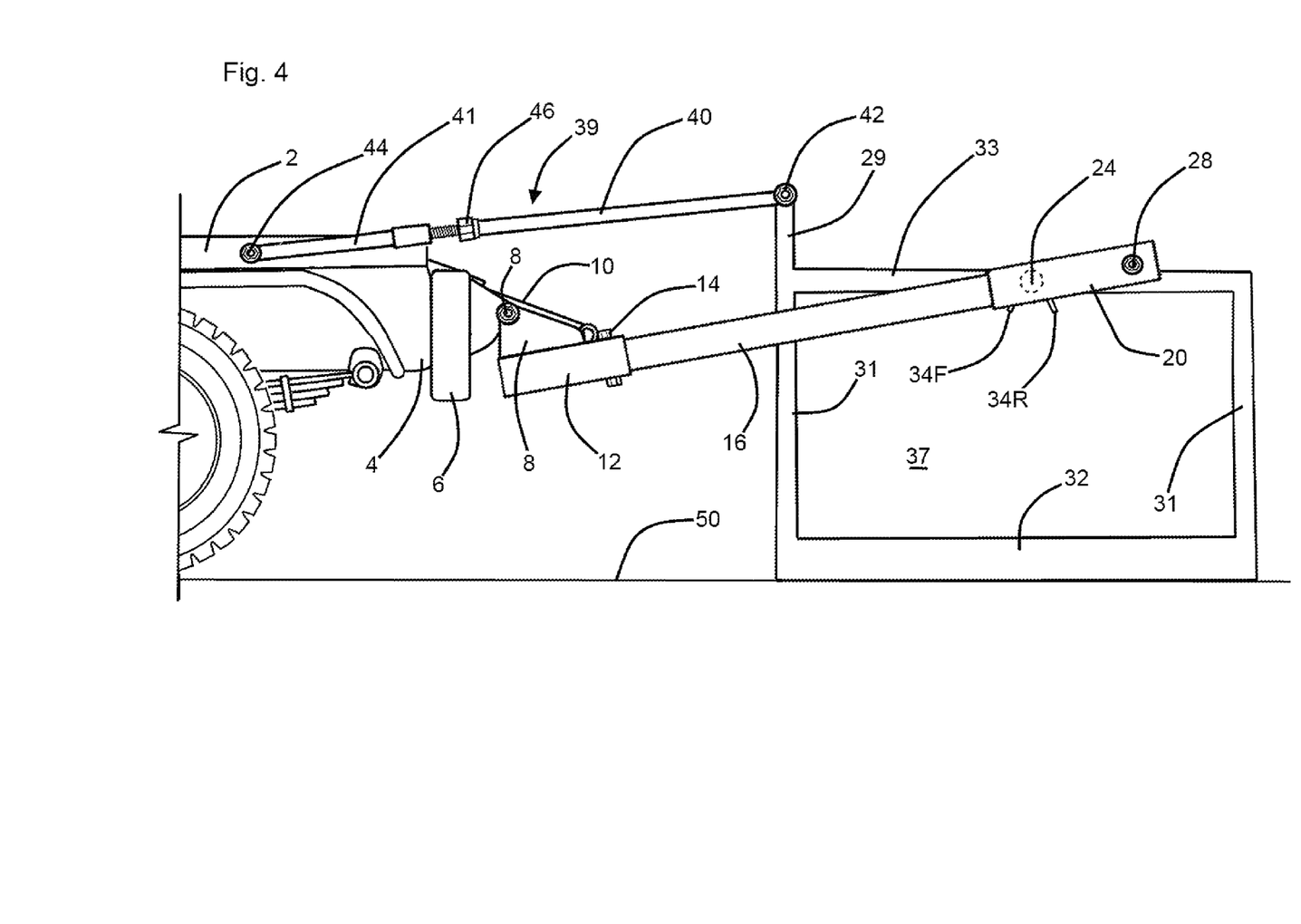
FIG. 4 redepicts the views of FIG. 1 and FIG. 2, the view of FIG. 4 showing the inventive assembly in its rearwardly extended and lowered position.

Referring simultaneously to FIGS. 1 and 3, left and right bale lift arms 16 and 18 are attached to the rearward end of the truck bed 2 by a pivotal motion actuator assembly. In a preferred embodiment, the pivotal motion actuator assembly comprises a hinge 8 for pivoting and counter-pivoting rearward and forward movements of the bale lift arms 16 and 18, and a longitudinally aligned hydraulic ram or cylinder 10 is installed for actuating such pivotal motion. A base or cross member 12 spans between and interconnects the proximal ends of the bale lift arms 16 and 18 to form a "U" caliper configuration. Each of the bale lift arms 16 and 18 is mounted pivotally thereon by a pivot joint 14, and laterally aligned hydraulic cylinders (not depicted within views) are preferably housed within the cross member 12. Such laterally aligned hydraulic cylinders typically function to laterally and reciprocatingly pivot the bale lift arms 16 and 18 to cause their distal ends to alternatively engage with and disengage from hay bale loads. The pivoting and hydraulically actuated bale loading arm assembly depicted in FIGS. 1, 2, and 4 is presented as being representative of all such rear truck bed mounted assemblies regardless of their particular mode of interconnection with the truck bed, and regardless of their particular arm pivoting actuator means.

Referring simultaneously to FIGS. 1 and 3, in place of carriage of heavy round and cylindrical hay bales (not depicted within views) which are conventionally carried by the lift arms 16 and 18, a cargo carrier is provided. The cargo carrier, as depicted, has a floor 32, a plurality of rigid suspension ties 31 whose lower ends are fixedly attached to the floor 32, a pair of or front and rear stiffening crossbeams 35, and a pair of or left and right longitudinally extending beams 33. The cargo carrier 31, 32, 33, 35 is presented as representative of various types of enclosures, bins, baskets, carry frames, boxes, vessels, and encasements which may define a cargo carrying space 37.

Figure 6:
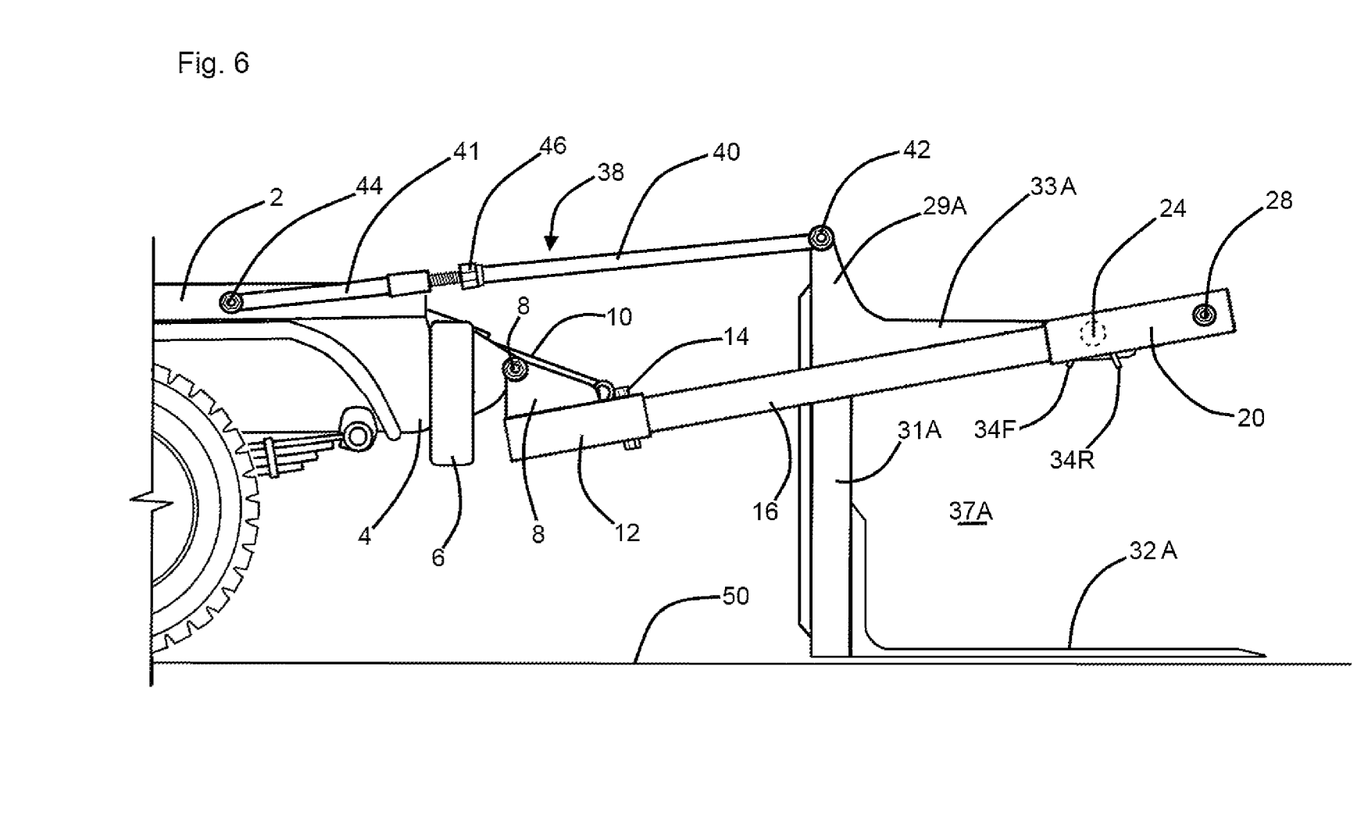
FIG. 6 redepicts FIG. 4, the view of FIG. 6 showing an alternatively configured cargo carrier.

Referring simultaneously to FIGS. 1, 3, and 6, the cargo carrying space 37 may alternatively comprise a space 37A which overlies and is defined by a specially reconfigured floor, wherein the floor is adapted to function as a pair of cantilevered forklift tines 32A. In the alternative cargo carrier configuration of FIG. 6, suspension ties 31A are bolstered for cantilevering support of the floor/forklift tines 32A, rearward suspension tie frame members 31 are removed for clearance to enable forklift tine engagement of load pallets, and longitudinally extending frame members 33A are truncated for similar cantilevering extension.

Referring to FIG. 1, the instant inventive auxiliary assembly preferably further comprises at least a first, and preferably paired left and right cargo carrier leveling arms 39. Each of the left and right leveling arms 39 are preferably segmented to include a distal segment 40, and proximal segment 41. Telescoping means are preferably provided for functionally interconnecting the distal 40 and proximal 41 ends of the leveling arm 39, such telescoping means being represented by the depicted adjustable jack screw assembly 46. Such jack screw assembly telescoping means 46 is presented as being representative of other commonly known telescoping actuators such electric motor driven screws and hydraulic cylinders mounted for telescoping extension and retraction of a quill and stem combination.

Referring further to FIG. 1, leveling arm attaching means are preferably provided for pivotally interconnecting the distal ends of the leveling arms 39 with the cargo carrier 31, 32, 33, 35 (or, with reference to FIG. 6, cargo carrier 31A, 32A, 33A, as the case may be) and for pivotally interconnecting the proximal ends of the leveling arms 39 with the truck bed 2. Such leveling arm attaching means, as depicted, are represented by pivot joints 42 and 44, the proximal pivot joint 44 preferably positioning the leveling arms' proximal end forwardly from the rearward end of the truck bed 2. The leveling arm attaching means are preferably further adapted for positioning the leveling arms' pivotally attached distal ends forwardly from the co-pivoting distal ends of the bale lift arms 16 and 18. The leveling arm attaching means preferably further comprise upward extensions 29 of the forward suspension ties 31, such extensions accommodating for the vertical position differential between the elevation of the pivotal attachments 44 of the proximal ends of the leveling arms 39 with the truck bed 2, and the corresponding co-pivoting pivotal attachments of the proximal ends of the bale lift arms 16 and 18.

Figure 5:
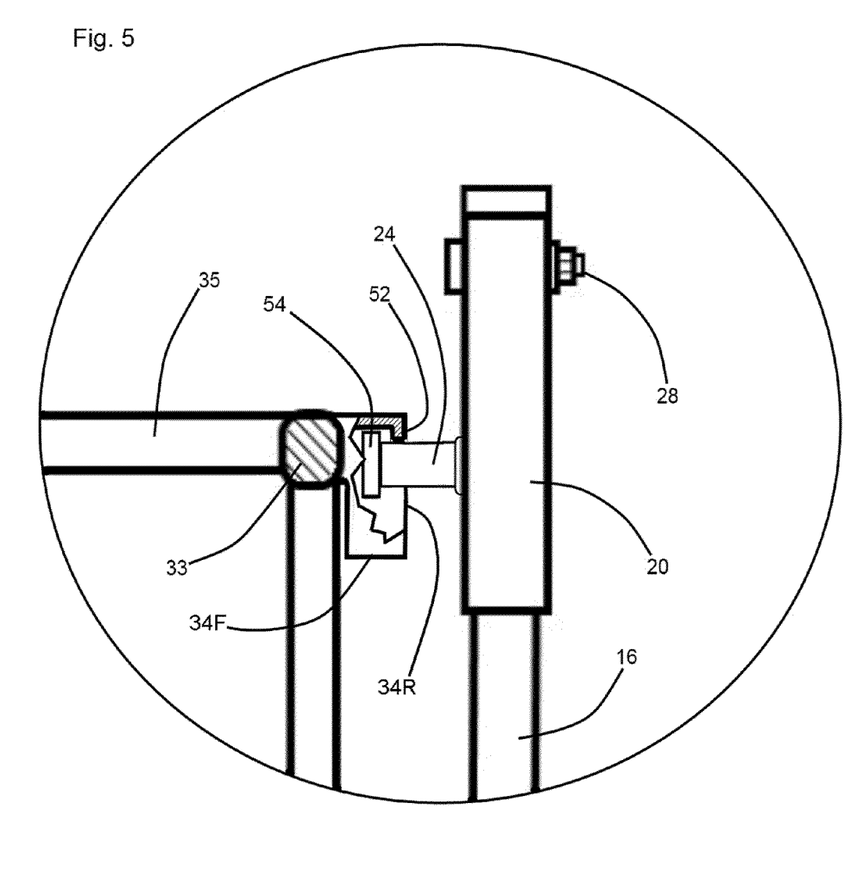
FIG. 5 is a magnified view as indicated in FIG. 3, the view of FIG. 5 including a cutaway section exposing internal structures of a swivel pin and socket joint.

Referring simultaneously to FIGS. 3, 4, and 5, the instant inventive auxiliary assembly comprises lift arm attaching means which are adapted for pivotally interconnecting the cargo carrier with the distal ends of the left and right bale lift arms 16 and 18. In a preferred embodiment, such lift arm attaching means comprise left and right swivel pins 24 and 30 which are fixedly attached to and respectively cantilever rightwardly and leftwardly from the distal ends of the bale lift arms 16 and 18. Such swivel pins preferably releasably engage left and right swivel sockets 34F, 34R, and 36F, 36R (the 36R flange component of the right swivel socket not being within views but being configured similarly with the rearward flange component 34R of the leftward swivel socket). The forward and rearward flanges of the left and right swivel sockets 34F, 34R, 36F, and 36R are preferably splayed in an inverted "V" configuration for guiding and capturing the enlarged distal or inner ends 54 of the swivel pins 24 and 30. As is particularly depicted in FIG. 5, the upper vertices formed by the "V" shaped flanges 34F, 34R, 36F, 36R preferably are configured to present semi-circular retainer flanges 52, such flanges 52 advantageously serving as stops which may abut the swivel pins' retainer flanges 54 for prevention of any accidental socket disengagements of the swivel pins 24 and 30.

Referring simultaneously to FIGS. 1, 2, 3, and 5, where the truck bed 2 is relatively short, the lift arm attaching means may be modified to include left and right adaptor sleeves 20 and 22 which are closely fitted for slidably and nestingly receiving the distal ends of the left and right lift arms 16 and 18. Where the adaptor sleeves 20 and 22 are utilized, laterally extending nut and bolt combinations, or slip pin and keeper combinations 28 and 30 preferably extend laterally through eye openings within the left and right sleeve adaptors 20 and 22, such pins or bolts 28 and 30 also extending in a double shear fashion laterally through apertures (not depicted within views) within the distal ends of the left and right lift arms 16 and 18, such laterally extending lift arm apertures conventionally mounting hay bale engaging spikes or plates when the auxiliary assembly is not attached and in use.

Where sleeve adaptors 20 and 22 are provided, the swivel pins 24 and 30 are preferably rigidly welded upon interior surfaces of the adaptors 20 and 22. The sleeve adaptors 20 and 22 serve the function of proximally displacing the swivel pins 24 and 30 from the extreme distal ends of the lift arms 16 and 18. Such proximally displaced positioning of the swivel pins 24 and 30 along the lengths of the sleeve adaptors 20 and 22 advantageously adjusts and decreases the effective radius of the lift arms 16 and 18 in order to accommodate for a relatively short truck bed 2, or to accommodate for a relatively ling cargo carrier. Suitably, and alternatively, distally displaced swivel pin receiving apertures (not depicted within views) may be provided, such apertures extending directly into and through the bale lift arms 16 and 18, without the provision or utilization of the sleeve adaptors. In either case, distal displacement and adjustment of the mounting points of the swivel pins 24, 30 with respect the extreme distal ends of the bale lift arms 16, 18 decreases the effective radius of the lift arms 16, 18 to achieve proper positioning of the cargo carrier 31, 32, 33, 35 upon a relatively short truck bed 2.

In use of the instant inventive auxiliary assembly, and assuming commencement at the configuration of FIG. 1, an operator may actuate and extend hydraulic cylinder 10, causing the lift arms 16 and 18 to pivotally move from their forward load depositing and retaining position depicted in FIG. 1, through the intermediate position depicted in FIG. 2, and to the rearwardly extended position depicted in FIG. 4. Thereafter, the load bearing space 37 of the carrier may be filled with heavy equipment and materials. Thereafter, the hydraulic ram 10 may be actuated to retract, and to load the cargo carrier upon the truck bed 2 as depicted in FIG. 1.

During the pivotally moving passages of the lift arms 16 and 18 between the positions depicted in FIGS. 1, 2, and 4, the load leveling arms 39 advantageously co-pivot in substantially parallel orientations with the effective radius of the lift arms 16 and 18, such radius extending along a lines from the lift arms' proximal pivot axes to the pivot axes of the swivel pins 24 and 30. As the result of such substantially parallel co-pivoting movement, the leveling arms 39 advantageously keep the cargo carrier in a substantially level and horizontal orientation without allowing any undesirable oscillations of the cargo carrier.

Referring to FIGS. 3 and 4, the instant inventive auxiliary assembly may be conveniently detached or uninstalled by detaching and disengaging swivel mount 44, by further rotating and slightly lowering the left and right lift arms 16 and 18, thereby causing swivel pins 24 and 30 to downwardly disengage from their swivel sockets, by releasing and disengaging pins 28 and 30, and by slidably removing the sleeve adaptors 20 and 30. Thereafter, the truck and bale lifter assembly may be moved away from the auxiliary assembly and hay bale engaging spikes or plates may be reinstalled at the distal ends of the lift arms 16 and 18. Thereafter, the truck and hay bale lifter may be utilized in a conventional fashion for engaging, grasping, and loading or off-loading round hay bales.

Referring in particular to FIG. 6, in the event that the cargo carrier is configured as a forklift auxiliary component 29A, 31A, 32A, 33A, the truck and attached auxiliary assembly may be driven and maneuvered to cause the floor/forklift tines 32A to engage a cargo laden pallet. Thereafter, the inventive assembly may be operated in the manner described above for loading such pallet and its load onto the truck bed 2. In many circumstances, it is desirable that such floor/forklift tines 32A be slightly canted upwardly in order to prevent such a loaded pallet from sliding along the tines. In order to accomplish such desirable canted orientation of the tines 32A, the jack screw telescoping means 46 may be operated to draw the distal 40 and proximal 41 segments of the leveling arm 39 toward each other, thereby shortening the effective length of such arm, and appropriately canting the entire cargo carrier including tines 32A.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. An auxiliary assembly for alternative attachment to and detachment from a truck bed, the truck bed having left and right sides, a rearward end, and rearwardly mounted left and right bale lift arms, the left and right bale lift arms having pivotal radiuses, proximal and distal ends and being adapted for moving between rearwardly extending bale engaging positions and forwardly extending bale depositing positions, the truck bed further having at least a first pivotal motion actuator connected operatively for impelling the left and right bale lift arms' movements, the auxiliary assembly for attachment to and detachment from the truck bed comprising:
   (a) a cargo carrier having left and right sides;
   (b) lift arm attaching means adapted for respectively pivotally interconnecting the cargo carrier's left and right sides and the left and right bale lift arms' distal ends, and for respectively disconnecting the left and right lift arm's distal ends from the cargo carrier's left and right sides, the left and right lift arm attaching means comprising left and right swivel pin and socket joints;

(c) first and second leveling arms having proximal and distal ends; and (d) leveling arm attaching means adapted for pivotally mounting the first and second leveling arms' proximal ends upon the truck bed, for alternatively disconnecting said proximal ends from the truck bed, for positioning said proximal ends forwardly from the truck bed's rearward end, for pivotally mounting the first and second leveling arm's distal ends upon the cargo carrier, and for positioning said distal ends forwardly from the left and right bale lift arms' distal ends, the left and right lift arm attaching means comprising left and right sleeve adaptors, the left and right sleeve adaptors being respectively fitted for nestingly receiving the left and right bale lift arms' distal ends.

2. The auxiliary assembly for alternative attachment to and detachment from a truck bed of claim 1 wherein the leveling arm attaching means are adapted for, upon the left and right bale lift arms' pivotal movements, simultaneously pivotally moving the first and second leveling arms.

3. The auxiliary assembly for alternative attachment to and detachment from a truck bed of claim 2 wherein the leveling arm attaching means are further adapted for, upon the first and second leveling arms' simultaneously pivoting movements, orienting the first and second leveling arms in substantially parallel alignments with the left and right lift arms' pivotal radiuses.

4. An auxiliary assembly for alternative attachment to and detachment from a truck bed of claim 1, wherein the left and right swivel pins are respectively fixedly attached to and are respectively cantilevered rightwardly and leftwardly from the left and right sleeve adaptors.

* * * * *